United States Patent [19]

Osborne

[11] 3,792,201

[45] Feb. 12, 1974

[54] TIME-DIVISION MULTIPLEX FRAMING CIRCUIT

[75] Inventor: Thomas Lawrence Osborne, Georgetown, Mass.

[73] Assignee: Bell Telephone Laboratories, Incorporated, Murray Hill, N.J.

[22] Filed: Aug. 15, 1972

[21] Appl. No.: 280,796

[52] U.S. Cl. ............................................. 179/15 BS

[51] Int. Cl. ............................................... H04j 3/06

[58] Field of Search ............ 179/15 BS; 178/69.5 R

[56] References Cited

UNITED STATES PATENTS

| | | | |
|---|---|---|---|
| 3,404,231 | 10/1968 | Aaron | 178/69.5 R |
| 3,436,480 | 4/1969 | Pan | 178/69.5 R |
| 3,454,722 | 7/1969 | Jousset | 179/15 BS |
| 3,562,432 | 2/1971 | Gabbard | 179/15 BS |

*Primary Examiner*—Kathleen H. Claffy
*Assistant Examiner*—David L. Stewart
*Attorney, Agent, or Firm*—E. W. Adams, Jr.

[57] ABSTRACT

A framing circuit for use in time-division multiplex decoders utilizes a digital "1" in the first timing slot in each frame of input data to synchronize the decoder. In the decoder, the input signal is demultiplexed into separate information channels which are separately decoded. The output signal of the first channel is then applied to a threshold detector. If the decoder is in-frame, the threshold detector will indicate that the output of the first channel is higher than the reference level of the detector. When the decoder is out-of-frame, the first channel output will vary randomly, falling below the threshold level. This will cause a signal to be generated which will block one of the timing pulses to the demultiplexer, thereby causing the relative channel locations to change by one position. This is repeated until the first framing time slot corresponds to the first decoded channel.

6 Claims, 2 Drawing Figures

TIME-DIVISION MULTIPLEX FRAMING CIRCUIT

BACKGROUND OF THE INVENTION

This invention relates to synchronizing circuits and, more particularly, to framing circuits for use in time-division multiplex decoders.

In a time-division multiplex transmission system a plurality of channels of information are multiplexed onto a single transmission line. This is accomplished by considering the transmitted signal as being composed of frames of information. The bits of the various channels of input information are applied to separate timing slots in each frame. For example, the samples or digital bits of channel 1 can be placed in timing slot 1 of each frame; the bits of channel 2 can be placed in timing slot 2; and so on. In the receiver the signals in each timing slot are separated and decoded to produce replicas of the separate input signals for each channel. However, to assure that each replica is connected to the correct output channel, some means must be provided for synchronizing the decoder circuits in the receiver to the multiplexing circuits in the transmitter. The circuit which performs this operation is known as a "framing circuit". Generally, the synchronization is achieved with the aid of framing bits, which are transmitted along with the message signals and which occupy at least one timing slot per frame. In the receiver, a code pattern, identical to the framing bit pattern, is generated in synchronism with the decoder and the contents of a particular time slot in the receiver signal are compared bit for bit with the locally generated code pattern. When there is an error, one pulse of the clock which controls the decoder is inhibited, thereby causing the contents of the next timing slot to be compared with the locally generated code. This is continued until frame synchronization is indicated by perfect coincidence between the contents of the timing slot under test and the local code. Synchronism can also be detected without the use of a locally generated code if the framing bits have a simple pattern, such as alternating "1's" and "0's", or all "1's". In such a case, the time slots are sequentially checked until the one having the proper code pattern is found.

One problem with these types of circuits is that a single error in the comparison operation caused by noise or other distortion will force the framing circuit to recycle. Therefore, it is desirable to incorporate a degree of hysteresis into the system. This can be done by integrating and threshold detecting the output of the comparator circuit. When there is correspondence between the received bit in the timing slot being checked and the locally generated bit, the comparator can be made to generate a digital "1". These "1's" are then integrated and will produce a maximum voltage when the channel is in-sync. However, when the comparison fails during one time period, there will be a small reduction in the integrator output voltage. Adjustment of the reference level of a threshold detector connected to the output of the integrator circuit causes the framing circuit to function in such a way that an inhibit pulse for the local clock will not be generated unless the comparison fails a number of times. Hysteresis can also be included in a framing circuit by using a digital counter circuit which counts the output pulses from the comparator. When an arbitrary maximum count is reached, the counter is locked out. Then, when a frame error occurs, the counter is reset, but recycling occurs only when there is a second frame error before the counter reaches the maximum again.

While the framing circuits disclosed in the prior art provided synchronization with hysteresis, they are costly and complicated because of the need for additional integrating or counting circuits. It is, therefore, the object of this invention to overcome these difficulties by utilizing much of the existing circuitry in the receiver to accomplish the operation of frame synchronization with hysteresis.

SUMMARY OF THE INVENTION

The present invention is directed to simplifying hysteresis-type frame synchronization in a time-division multiplex system by utilizing the decoder circuitry of the receiver. This has the advantage of reducing the cost and complexity of the circuit.

In an illustrative embodiment of the invention, the multiplex system uses a signal format with a digital "1" in the first timing slot as the framing bit. In the receiver, the input signal is regenerated in a pulse generator so that the pulses have a uniform height. I addition, the input signal is used to synchronize a local clock. After regeneration, the input signal is applied to a combination charge parceling integrator and analog switch, which separates the input signal into the various data channels and converts them into analog signals. The framing circuit then controls the operation of the analog switch so that the bits contained in the various time slots of the input signal are applied to the appropriate analog output channel circuits. This is accomplished by connecting the analog output at the first output channel terminal to a threshold detecting circuit, which will produce an output when the signal at the first output channel terminal is below a selected reference level. Since the framing bits all represent digital "1's" there will be no output from the threshold circuit when the decoder is in-frame, or synchronized. HOwever, when the circuit is out-of-frame, the output signal of the first channel will vary according to the input signal at the transmitter, causing the threshold detector to generate output pulses. Each output of the threshold detector is used to inhibit one pulse of the local clock, thereby causing the analog switch to change the channel output signal positions relative to the input data by one space. This process is continued until the channels are in the correct relationship to the time slots of the input signal, indicating that the decoder is synchronized with the transmitter. Adjustment of the reference level of the threshold detector prevents the circuit from recycling during an isolated erroneous framing error. In addition, framing can be more accurately determined through the use of the second timing slot for transmission of a second framing bit. When this bit is made a digital "0", additional threshold detecting circuits to determine a low output voltage from the second channel are included.

The foregoing and other features of the present invention will be more readily apparent from the following detailed description and drawings.

DETAILED DESCRIPTION

Figures 1, 2:
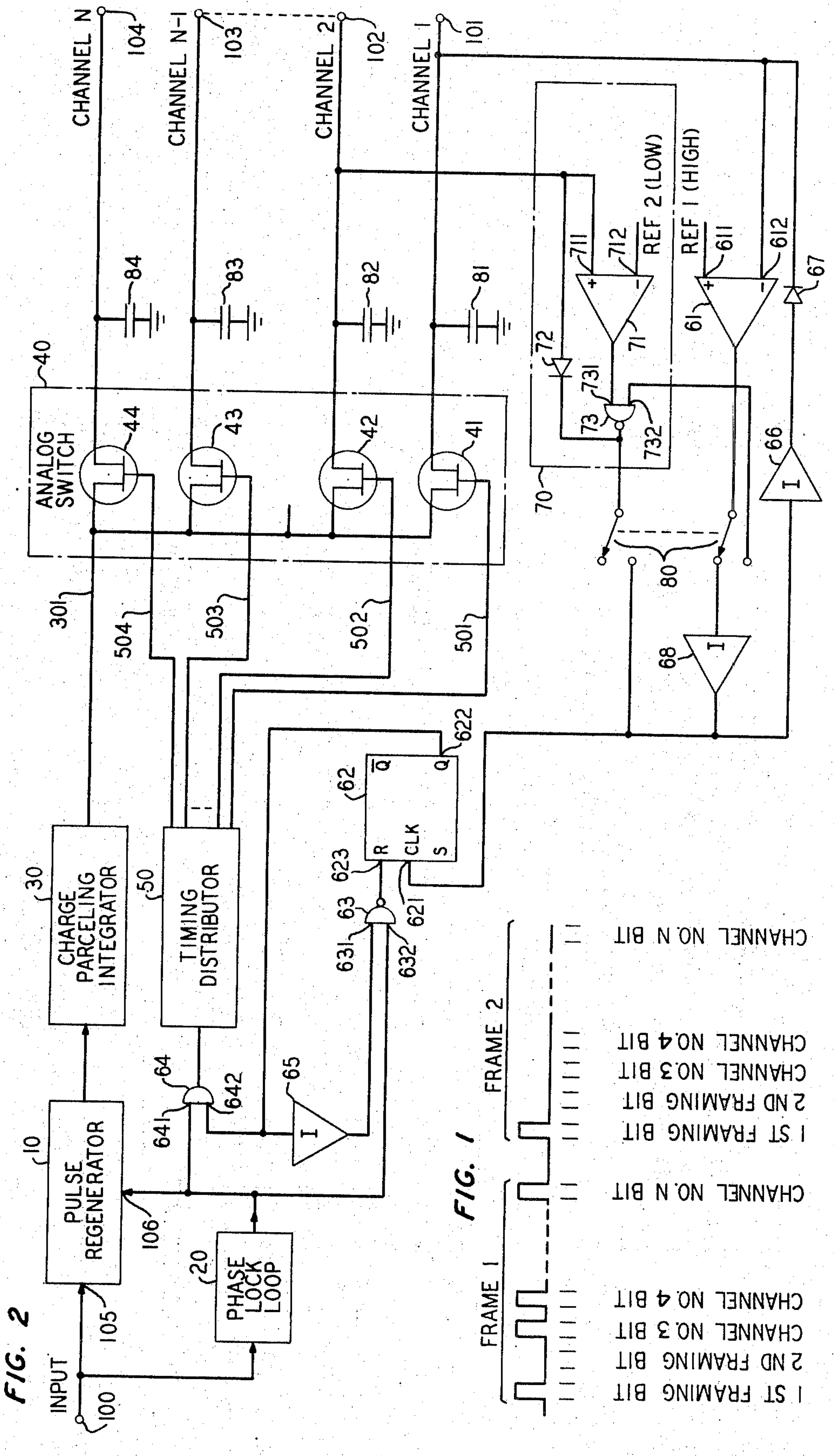
FIG. 1 is a diagram of a typical input signal format.
FIG. 2 is an illustrative embodiment of the invention used in the receiver of an N channel time-division multiplex delta modulation transmission system.

The format shown in FIG. 1 for the time-division multiplex delta modulation signal applied to input terminal 100 of the receiver shown in FIG. 2 has the series of information bits divided into frames with N timing slots in each frame. The information bits occur during the timing slots and the first timing slot in each frame contains a digital "1" as a framing bit. As will be discussed later, the second timing slot may also contain a digital "0" as a framing bit. The remaining timing slots in each frame contain the delta modulation bits for the remaining channels; that is, the digital code for the third channel signal is located in the third timing slot in each frame; the digital code for the fourth channel signal is located in the fourth timing slot; and so on through the remaining channels and timing slots. It should be noted that, although the preferred embodiment utilizes a delta modulation signal, the invention can also be used with other types of digital codes.

The input signal at terminal 100 is applied both to input 105 of pulse regenerator 10 and the input of phaselocked loop 20. The phase-locked loop generates a local clock signal which is in synchronism with the input data and can be any of the conventional phase-locked loops well known to those skilled in the art. The clock signal from phase-locked loop 20 is applied to input terminal 106 of pulse regenerator 10. The regenerator circuit, in response to the clock pulses, samples the input signal at terminal 105 and produces a regenerated version of it with pulses of equal amplitude at its output. This pulse regenerator circuit can also be of conventional design.

In addition to the pulse regenerator, the phaselocked loop 20 also supplies a clock signal to terminal 641 of AND gate 64. This clock signal normally passes through AND gate 64 to the input of timing distributor 50. Timing distributor 50 sequentially generates pulses on its N output lines, represented by lines 501 through 504 in FIG. 2, in response to the input clock signal from gate 64. This timing distributor can be a conventional circuit, such as a ring counter or a shift register.

The regenerated input signal appearing at the output of pulse regenerator 10 is applied to the input of charge parceling integrator 30. This charge parceling integrator could be any of those well known in the prior art. In particular, the charge parceling integrator could be of the type disclosed in the present inventor's copending patent application, Ser. No. 272,853, filed July 18, 1972, now U. S. Pat. No. 3,750,143, issued July 31, 1973. In the aforementioned patent, the charge parceling integrator requires a separate integrating capacitor for each output channel. These capacitors are represented by capacitors 81 through 84 in FIG. 2. In addition, analog switch 40 must be provided in order to connect sequentially the charge parceling integrator to the integrating capacitor for the channel whose bit is being decoded. Analog switch 40 consists of field-effect transistors 41 through 44, having their drain-source paths connected between the output line 301 of the charge parceling integrator and the N output terminals 101 through 104, respectively. The output lines 501 through 504 from timing distributor 50 are connected to the gates of separate field-effect transistors in the analog switch.

In the arrangement as described to this point, the input signal is used to synchronize a phase-locked loop and is regenerated in pulse regenerator 10. The output of the phase-locked loop, in combination with the timing distributor, then allows the integrating capacitors for the separate output channels to be sequentially connected to the charge parceling integrator. The charge parceling integrator, in combination with the integrating capacitors, generates analog equivalents of the separate channels of delta modulation signals at the various output terminals. However, there is nothing in this arrangement to assure that the contents of the timing slots are being integrated to form the analog signals at the appropriate channel output terminals. The only thing that is certain is that the signals from the timing slots will maintain the same relative position with respect to each other even though they may be appearing at the wrong output terminals.

In order to assure proper framing, the fact that the first timing slot contains all "1's" as framing bits can be used to advantage. The output channel at which the contents of the first timing slot are being decoded will have a constant maximum voltage, while the other outputs will have signals which vary with the input signals to those channels at the transmitter. To determine if the contents of the first timing slot are actually being decoded at the channel 1 output terminal, a threshold detector 61 is provided. The output terminal 101 of channel 1 is connected to the negative input terminal 612 of threshold detector 61 and the positive terminal 611 of this detector is connected to a reference voltage level. This reference level is adjusted so that it is just below the voltage expected at the output terminal of channel 1 when all of the signals decoded at that terminal are digital "1's". When some of the signals are not "1's", the voltage at the channel 1 output terminal will drop below the reference level, thereby indicating that it is not decoding the contents of the first timing slot. When this occurs the threshold detector will generate a positive voltage pulse which passes through switch 80 and is inverted by digital inverter 68.

The negative signal from inverter 68 is applied to the trigger or clock input terminal 621 of flip-flop 62, producing a digital "0" signal at output terminal 622 of the flip-flop. The output signal at terminal 622 is applied to input 642 of AND gate 64, thereby inhibiting the clock signal at terminal 641 of the AND gate from passing to the input of timing distributor 50. Since one of the clock pulses to the timing distributor is blocked, preventing the analog switch from advancing, while the input signal remains unaffected, the relative positions of the signals at the output terminals will change by one space.

The framing circuitry comprising threshold detector 61, flip-flop 62 and AND gate 64, in effect, monitors the signal at the first channel output terminal to see if it represents the contents of the first timing slot. When it does not, the voltage at this terminal will be less than the reference voltage on the threshold detector and will produce the sequence of events which results in the blocking of one clock pulse. The removal of this clock pulse then causes a new timing slot to be decoded at the channel 1 output terminal. This process continues until the contents of the first timing slot of the message signal are being decoded at the channel 1 output terminal.

When the threshold detector indicates that the circuit is out-of-frame, the negative pulse produced at digital inverter 68 is re-inverted by digital inverter 66. This re-inverted pulse is coupled to the channel 1 output terminal by a diode 67 having its anode connected to the output of inverter 66 and its cathode connected to the channel 1 output terminal 101. This causes capacitor 81 to recharge to its in-frame voltage through diode 67. Therefore, when the contents of the new timing slot are decoded at the channel 1 output terminal, the circuit begins from an in-frame condition. At the same time that the voltage on capacitor 81 is being restored to its in-frame condition, digital inverter 65 and NAND gate 63 are resetting flip-flop 62 so that only one clock pulse is lost for each out-of-frame signal from threshold detector 61. When the out-of-frame signal causes the clock pulse to be blocked in AND gate 64 by the output at terminal 622 of flip-flop 62, this same flip-flop output signal is inverted by digital inverter 65 and applied to input terminal 631 of NAND gate 63. This allows one of the clock pulses applied to terminal 632 of NAND gate 63 to pass through the NAND gate and reset flip-flop 62 at terminal 623. Therefore, the timing pulse which was blocked from the timing distributor by the action of the flip-flop is used to reset the flip-flop to its initial condition.

When the voltage reference level at input 611 of threshold detector 61 is set too close to the maximum expected voltage at the output of channel 1 for an in-frame condition, the absence of a single digital "1" in the timing slot being decoded at that terminal will cause the circuit to recycle. However, the absence of this "1" could be due to noise or phase distortion in the transmission system and not to the fact that the circuit was out-of-frame. When the reference voltage is adjusted so that it is significantly below the maximum in-frame voltage, the problem of erroneous out-of-frame signals can be avoided. This, in effect, provides a degree of hysteresis in the framing circuit since it will require the absence of more than one digital "1" before the out-of-frame signal will be generated. However, when too much hysteresis is added to the circuit it is possible for it to lock to a non-framing channel which has a large number of digital "1's" in its signal. To avoid this problem, two timing slots can be used for the transmission of two framing bits per frame.

Additional circuitry 70, shown in the dashed box in FIG. 2, is provided for the situation when timing slot 2 carries a second framing bit for each frame. This second framing bit is made equal to a digital "0". The additional circuitry, 70, consists of a threshold detector 71, a diode 72 and a NAND gate 73. To bring this circuitry into operation, switch 80 is changed from the normal position shown in FIG. 2 to its other position. Under this condition the output of channel 2 at terminal 102 is applied to the positive input 711 of threshold detector 71 and a second reference voltage is applied to terminal 712. The output of the threshold detector is applied to input terminal 731 of NAND gate 73. In addition, the output of threshold detector 61 is removed from digital inverter 68 by switch 80 and is connected to input 732 of NAND gate 73. The second reference voltage is adjusted to be slightly above the minimum voltage expected at channel 2 when the all digital "0" contents of timing slot 2 are decoded there. With this arrangement, NAND gate 73 will generate a negative output pulse which will result in the blocking of one clock pulse from timing distributor 50 whenever the voltage at channel 1 is below the first reference level and the voltage at channel 2 is above the second reference level. To initialize the channel 2 signal after an out-of-frame signal has been generated, a diode 72 is provided with its cathode connected to the output of NAND gate 73 and its anode connected to terminal 102. Therefore, a ground level will be applied through diode 72 to capacitor 82 whenever an out-of-frame pulse is generated by NAND gate 73. This will cause the voltage on capacitor 82 to return to its in-frame condition, which is a voltage near zero. By using two timing slots in each frame for the transmission of framing bits, as described above, the message handling capacity of the system will be reduced. However, it allows more hysteresis to be included in the circuit through the adjustment of the reference voltage levels, because it is unlikely that two adjacent timing slots, which are not the framing time slots, will have nearly all "1's" in the first of these timing slots and nearly all "0's" in the second. This additional hysteresis will permit the framing circuit to operate on signals in noisy environments without locking to message signals which are similar in content to the framing bits.

A particular advantage of the present invention is that the framing circuits operate on the decode version of the framing bits. Therefore, no special integrating or counting circuits are required for its operation. The framing circuit uses the same charge parceling integrator and analog switch that the rest of the decoder uses. Because of integrated circuit techniques this can result in cost savings since the analog switch with the extra positions for the framing bits can be fabricated in one step. Also, the other parts of the framing circuit use digital elements which are easily integrable.

While the invention has been particularly shown and described with reference to preferred embodiments thereof, it will be understood by those skilled in the art that various changes in form and details may be made therein without departing from the spirit and scope of the invention. I claim:

1. A framing circuit for use in the decoder of an N channel time-division multiplex system having at least one framing bit in at least one framing time slot of the N timing slots in each frame of input data, comprising:

clocking means for producing clock pulses which are synchronized with the input data;

means for demultiplexing the decoding the bits in each of the N timing slots of each frame of data in response to clock pulses applied to it, the demultiplexed and decoded bits forming N separate channels of analog output signals at N output terminals;

a reference voltage source having a reference voltage output uniquely associated with the channel output signal from each framing time slot;

a threshold detecting means for producing a control signal when the channel output signal corresponding to each framing time slot differs from its associated reference voltage output in a predetermined sense;

means for inhibiting one of the clock pulses applied to said means for demultiplexing and decoding in response to the control signal; and means for establishing an initial value for the channel output signal corresponding to each framing time slot in response to the control signal.

2. A circuit as claimed in claim 1 wherein said means for inhibiting comprises:

a bistable circuit for alternately generating high and low positive voltage levels at its output in response to a signal at its TRIGGER input and for generating a high positive level in response to a signal at its RESET input, the control signal of said threshold detector being applied to the TRIGGER input;

a two-input AND gate having the output of said clocking means applied to one input and the output of said bistable circuit applied to its other input, the output of said two-input AND gate being the clock pulses applied to said means for demultiplexing and decoding;

an inverter for producing an inverted version of the output of said bistable circuit element; and an inhibiting two-input NAND gate having the output of said clocking means applied to one input and the output of said inverter applied to the other input, the output of said inhibiting NAND gate being applied to the RESET input of said bistable circuit element.

3. A circuit as claimed in claim 1 wherein the one framing bit is a digital "1", the one framing time slot is the first timing slot of the frame, the channel output signal corresponding to the first timing slot is the first of N channel output signals, and the control signal of said threshold detector means is produced whenever the first channel output signal is below the first reference voltage output.

4. A circuit as claimed in claim 1 wherein the framing bits are a digital "1" and "0" located in the first and second timing slots, respectively, the channel output signal corresponding to the first timing slot is the first of N channel output signals, the channel output signal corresponding to the second timing slot is the second of N channel output signals, the reference voltage source has first and second reference voltage outputs, and the control signal of said threshold detecting means is produced whenever the output of the first channel is below the level of the first reference voltage output and the output of the second channel is above the level of the second reference voltage output.

5. A circuit as claimed in claim 4 wherein the threshold detecting means comprises:

a first comparator for generating an output whenever the voltage on its first input is larger than the voltage on its second input, the first reference voltage output being applied to the first input of said first comparator and the first channel output signal being applied to the second input;

a second comparator for generating an output whenever the voltage on its first input is larger than the voltage on its second input, the second channel output signal being applied to the first input of said second comparator and the second reference voltage output being applied to the second input; and a threshold detector two-input NAND gate having the output of said first comparator applied to its first input and the output of said second comparator applied to its second input, the output of said threshold detecting NAND gate being the control signal of said framing circuit.

6. A circuit as claimed in claim 5 wherein the means for establishing an initial value comprises:

an initial value inverter for generating an inverted version of the control signal at the output of said threshold detector NAND gate;

a first diode having the output of said initial value inverter applied to its anode and the first channel output signal applied to its cathode; and a second diode having the output of said threshold detector NAND gate applied to its cathode and the output of said second channel output signal applied to its anode.

* * * * *